3,360,580
LOW VISCOSITY POLYMER
Joseph K. Mertzweiller and Horace M. Tenney, Baton Rouge, La., assignors to Esso Research and Engineering Company, a corporation of Delaware
No Drawing. Filed Oct. 6, 1965, Ser. No. 493,539
6 Claims. (Cl. 260—669)

This invention relates to a method for the preparation of diolefin polymers having a terminal aromatic or alkyl aromatic group and more specifically relates to a method for carrying out this reaction so as to produce low molecular weight polymers at relatively low temperatures, with relatively small amounts of catalyst, and with relatively short reaction times and with good control of molecular weight distribution.

It is known to prepare polymers having a terminal alkyl aromatic group, such as benzyl, using sodium dispersions as the catalyst by carrying out the reaction in the presence of a chain transfer agent such as toluene and an ether such as tetrahydrofuran. A description of such a reaction can be found in the patent to Gleason, No. 2,993,050, issued July 18, 1961. However, the reaction is lengthy (15 to 60 hours or more), the commercially efficient temperatures are from 120 to 160° F. which lead to undesirable side reactions with the ether component. Furthermore, reaction rates are low.

It has now been found that when the polymerization is carried out in the presence of a soluble catalyst such as complexes of sodium or potassium with an aromatic hydrocarbon and a chain transfer agent such as toluene, products are obtained which are lower in molecular weight, possess a narrower molecular weight distribution and easily form water-soluble derivatives. The reaction time is reduced generally to one hour or less at temperatures as low as 32–80° F.

According to the present invention, therefore, a diolefinic hydrocarbon containing 4 to 10 carbon atoms is polymerized in the presence of 0.1 to 5% by weight (calculated as metal) of a sodium or potassium-aromatic hydrocarbon addition complex which is soluble in the reaction medium such as sodium or potassium naphthalene, anthracene, phenanthrene, etc., about 5 to 85% by weight of a hydrocarbon chain transfer agent and about 10 to 95% by weight of a suitable ether, all based on the total reaction medium. The molecular weight of the product is inversely proportional to the concentration of the chain transfer agent in the reaction medium. The mole ratio of monomer/catalyst also has an effect, the molecular weight increasing with increasing ratio, although this effect is not too pronounced. Temperature is important in that it influences weight by influencing the rate of chain transfer. Little chain transfer occurs below 32° F.; at temperatures above about 120° F. the catalyst may become at least partially deactivated due to reaction with the either modifier. Thus, the optimum temperature for this reaction lies in the range of 60–100° F. Products having molecular weights below 1500 and viscosities of the order of 0.1 to 10 stokes are thus easily obtainable. These polymers have a degree of polymerization (DP) between 1 and 30.

The unsaturated hydrocarbons suitable for use according to this invention are conjugated diolefins of 4 to 6 carbon atoms such as butadiene-1,3, isoprene, piperylene, 2,3-dimethylbutadiene-1,3 and 2-methyl pentadiene, as well as styrene and other aromatic olefins containing up to 10 carbon atoms. Mixtures of the above unsaturated hydrocarbons may also be copolymerized by the present process. A particularly suitable mixture is butadiene-1,3 and styrene.

The ethers suitable for use in this invention include tetrahydrofuran, tetrahydropyran, dimethoxy ethane, dimethoxy methane, methylal and dimethyl ether. Dioxane and diethyl ether are not suitable for use in this invention inasmuch as only low conversions are obtained.

The hydrocarbon chain transfer agent may be any alkylated aromatic hydrocarbon but those containing one or more methyl groups are preferred, e.g. toluene, ortho, meta and para xylene, mesitylene, durene, ethyl toluene, methyl naphthalene, methyl methano indene, and heterocyclic compounds such as alpha-methyl pyridine and its homologs. The chain transfer agents should not contain any groups that interfere with the reaction or poison the catalyst, such as halogen, nitrile, or hydroxy groups.

A separate diluent is not essential since the chain transfer agent and ether may act in this capacity. If a diluent is used it should be employed in an amount ranging up to 50% of the total reaction medium. The diluent should have a sufficiently high boiling range so as to be present as a liquid during the reaction, otherwise the pressure must be raised correspondingly to maintain the liquid phase. Suitable diluents include aliphatic, aromatic and naphthenic hydrocarbons boiling 0–400° F.

The monomer concentration is maintained between about 0.1 to 10 wt. percent of the total reaction medium but in general the monomer will tend to react as fast as it is fed to the system. Temperatures are maintained anywhere between 15 and 150° F. Reaction times of one hour or less are readily obtainable at temperatures as low as 32 to 80° F. In many systems the ability to dissipate the heat of polymerization will determine the rate at which the monomer can be added and hence the reaction time.

The initiator may be prepared by any suitable means known to the art. However, a particularly suitable method is to react lumps of sodium or potassium with naphthalene in tetrahydrofuran or other suitable ether, particularly the one to be used in the reaction, for one to two hours at about 120° F. The initiator system is limited for all practical purposes to sodium or potassium hydrocarbon complexes since the lithium complexes result in little or no chain transfer of the desired type. The initiator is fed to the reactor as a solution in the ether. The catalyst is thus soluble in the reaction medium and requires little agitation.

Destruction of the catalyst at the end of the reaction is effectively accomplished by the addition of an aqueous or anhydrous acid such acetic, sulfuric, phosphoric, hydrochloric or the like to precipitate the metal as the salt. The precipitated catalyst is removed from the reaction product by filtering or centrifuging. Catalyst deactivation can also be achieved by quenching and washing with water or by treating with an excess of clay containing bound water.

The resulting product is a low molecular weight polymer of largely 1,2 addition having the following structure when toluene is used as the chain transfer agent.

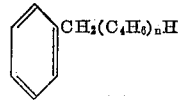

where $n$ is between 1 and 30. The value of $n$ decreases with increasing concentration of toluene or other chain transfer agent in the reaction. Thus the products are of very low molecular weight having a number average molecular weight between 150 and 1600. Those where $n$ is between 10 and 20 are particularly suitable for the preparation of water soluble coatings. The amount of chain transfer agent incorporated in the polymer is essentially one mole per mole of polymer. On a weight basis for the system in which butadiene is polymerized in the presence of toluene as the chain transfer agent, the amount of toluene incorporated is 63% for the case where $n=1$, 14.5% when $n$ is 10 and about 8.5% when $n$ is 20.

The products, particularly those where $n$ is between 10 and 20, can be hydroxylated by oxonation of the polymer in the presence of various hydroformylation catalyst systems. This product can be esterified with a suitable acid anhydride to form the half ester and the ester reacted with an amine to form water-soluble compounds.

The present invention affords significant advantages over prior art methods for forming low molecular weight polymers. The most significant advantage lies in the drastic reduction of the amount of initator required. This reduction may amount to as much as 90% compared to the case in which no chain transfer agent is used at a degree of polymerization ($DP=n$) of about 10. The process allows for precise control of the molecular weight and molecular weight distribution at low molecular weight levels.

The invention will be better understood from the subsequent illustrative examples. In these examples, as in other parts of the specification, when quantities are given in parts or percent, it will be understood that reference is had thereby to "parts by weight" unless expressly indicated to be otherwise.

Example 1

A series of polymers was prepared in a one liter autoclave by polymerizing butadiene with varying amounts of dry tetrahydrofuran, dry toluene, and sodium naphthalene. The following data were obtained.

TABLE I

| Run No | 1 | 2 | 3 |
|---|---|---|---|
| THF,[1] gms | 196 | 207 | 102 |
| Na as Na Naphthalene, GMS | 5 | 6 | 2.88 |
| Toluene, gms.: | 0 | 76 | 101 |
| Temp., °F | −11 to +4 | 26 to 32 | 77 |
| Time, min | 27 | 22 | 18 |
| Monomer, gms | 62.5 | 62.6 | 56.0 |
| $C_4H_6$/Na mole ratio | 6.4 | 4.6 | 10.0 |
| Polymer recovery, gms | 54.4 | 63.2 | [2] 37.2 |
| Polymer mol. wt. Mn | 1,270 | 708 | 469 |
| Polymer viscosity, stokes | 29 | 1.1 | 0.103 |
| Estimated percent, 1,2 addn | 73 | 69 | 54 |
| Aromatic content, percent | 0 | 7 | 17 |

[1] THF—tetrahydrofuran.
[2] Some low mol. wt. polymer lost in stripping.

The above data show the use of a chain transfer agent such as toluene in the polymerization of butadiene with a soluble metal aromatic compound (sodium naphthalene) results in the production of a very low viscosity polymer in a very short time. Under conditions of Run 1 no chain transfer agent is present and molecular weight and neat polymer viscosity are determined primarily by the $C_4H_6$/Na mol ratio. Run 2 represents conditions under which chain transfer occurs but to a very limited extent because of the lower than optimum temperature. In Run 3 the temperature was more optimum for chain transfer and a very low molecular weight was obtained at a relatively higher $C_4H_6$/Na ratio. A considerable portion of this polymer volatilized and was lost during stripping to remove unreacted toluene and the tetrahydrofuran.

The aromatic content of the products from Runs 2 and 3 gives a good index of the extent of chain transfer.

All of these runs were carried out under conditions of excellent heat transfer, but the reaction rates were still limited by ability to dissipate the heat of reaction. This limited the rate at which the monomer could be added and also the reaction time.

Example 2

A series of runs was made to determine the effects of toluene concentration and tetrahydrofuran concentration in the process of Example 1. The results are shown in Table II. The runs were made in a stirred glass apparatus to which the reaction medium (tetrahydrofuran, toluene and n-heptane) and sodium naphthlene initiator were charged and the butadiene added continuously into the vapor phase as fast as the heat of reaction could be dissipated by cooling in a Dry Ice bath.

TABLE II.—POLYMERIZATION OF BUTADIENE WITH SODIUM NAPHTHALENE EFFECTS OF COMPOSITION OF REACTION MEDIUM

| Run No | 4 | 5 | 6 | 7 | 8 | 9 |
|---|---|---|---|---|---|---|
| Medium Composition, Wt. percent: | | | | | | |
| Toluene | | 33 | 17.5 | 13 | 50 | 25 |
| Tetrahydrofuran | 100 | 67 | 82.5 | 87 | 50 | 25 |
| n-Heptane | | | | | | 50 |
| $C_4H_6$/Na mol ratio | 27 | 46 | 42 | 40 | 80 | 80 |
| Poly. Temp., °F., Avg | 86 | 77 | 77 | 77 | 77 | 77 |
| Poly. Time, Min | 30 | 35 | 30 | 32 | 128 | 63 |
| Yield, Wt. percent on $C_4H_6$: | | | | | | |
| Total polymer | ca. 95 | 116 | 110 | 104 | 115 | |
| Heavily stripped polymer [1] | ca. 95 | 88 | 95 | 98 | 74 | 92 |
| Avg. Mol. Wt.: Heavily stripped polymer, Mn | 2,836 | 617 | 717 | 958 | 638 | 547 |
| Viscosity, stokes | >1,000 | 1.85 | 4.7 | 26 | 2.4 | 2.1 |
| Aromatic content, percent | | 10 | 8 | 6 | 10 | 9 |

[1] Polymer heavily stripped to remove volatile light ends.

The above data show that the most critical feature is the concentration of toluene in the reaction medium. The higher the toluene concentration the lower the average molecular weight and the lower the viscosity of the neat polymer. The concentration of the tetrahydrofuran has no significant effect provided it is above about 15–20% in the medium at the start of the reaction. Its function is to maintain the proper state of solvation and activation of the charged species. Since the runs in Table II were carried out batchwise the concentration of toluene decreases as the runs progress. This is due to both incorporation of the toluene in the polymer and the dilution effect of the polymer. The toluene should never become depleted. A toluene depleted condition was approached in Run 7. Thus the effect on molecular weight and viscosity is proportionately much greater in going from the conditions of Run 6 to those of Run 7 (only 4.5% less toluene) than in going from the conditions of Run 5 to those of Run 6 (15.5% less toluene). Provided there is an excess of toluene the $C_4H_6$/Na mol ratio does not greatly influence the polymer molecular weight and viscosity (compare Runs 5 and 8).

Example 3

The series of runs tabulated below duplicate those of Run 8 of Example 2 except that various xylene isomers were used as chain transfer agents in place of toluene.

TABLE III

| Transfer Agent | Total Recovered Polymer | | | Heavily Stripped Polymer | | |
|---|---|---|---|---|---|---|
| | Yield, wt. percent on $C_4H_6$ | Vis., Stokes | Mol. Wt., $M_n$ | Yield, wt. percent on $C_4H_6$ | Vis., Stokes | Mol. Wt., $M_n$ |
| o-Xylene | 108.5 | 1.2 | 507 | 84.4 | 3.85 | 628 |
| m-Xylene | 115.5 | 0.6 | 461 | 80.6 | 2.25 | 582 |
| p-Xylene | 120 | 0.45 | 444 | 78.7 | 2.35 | 583 |

The above data show that all three of the xylene isomers are effective chain transfer agents. Para xylene is the most effective followed by m-xylene, and then by o-xylene. Mixed xylene isomers would be entirely satisfactory as transfer agents.

Example 4

This example shows the advantages for use of polymers prepared with the homogeneous initiator compared to polymers of similar molecular weight prepared with heterogeneous initiators, e.g., sodium dispersion. The following are typical preparations using sodium dispersion in a stirred autoclave at 105–125° F. It was generally impossible to initiate and sustain polymerization at temperatures below 100° F. with the sodium dispersion initiator.

TABLE IV

| Run No. | 10 | 11 |
|---|---|---|
| Medium Composition, wt. percent: | | |
| Toluene | 75 | 50 |
| Tetrahydrofuran | 25 | 50 |
| $C_4H_6$/Na mol. ratio | 62 | 42 |
| Poly. Temp. ° F., Avg | 104 | 122 |
| Time, Min | 165 | 80 |
| Yield, wt. percent on $C_4H_6$ (polymer stripped to 350° F. at <5 mms. Hg) | 65 | 96 |
| Avg. Mol. Wt., $M_n$ | 962 | 695 |
| Viscosity, stokes | 315 | 74 |

The polymerization was very sluggish under conditions of Run 10. Much of the butadiene remained unconverted as evidenced by the relatively low polymer yield. The most important point is that the viscosity of the polymer was about twelve times as high, as a polymer of comparable molecular weight obtained using the soluble initiator system (compare with Run 7, Example 2).

A smoother polymerization was obtained with higher tetrahydrofuran concentration and higher temperature (Run 11). Conversion of the monomer was essentially complete. Here again the bulk viscosity of the polymer product was some sixteen times greater than a product of comparable average molecular weight prepared with the homogeneous initiator (compare with Run 6, Example 2).

These effects are unquestionably due to molecular weight distribution, a much broader distribution being obtained with the heterogeneous initiator.

Example 5

A polymer having an average molecular weight of 445 was prepared using the homogeneous initiator (Na naphthalene), 67/33 weight ratio of toluene/tetrahydrofuran in the reaction medium and a $C_4H_6$/Na mole ratio of 72. This polymer was dissolved in benzene to a polymer content of 40% and 1000 grams of the solution were charged to a stirred autoclave along with 1.2 grams of cobalt in the form of the complex carbonyl $$[Co(CO)_3(P(C_4H_9)_3)]_2$$

The resin was treated at 1000 p.s.i.g. in the presence of a 1.4/1 mixture of hydrogen and carbon monoxide for forty minutes at 350° F. The treatment was followed by a treatment with hydrogen and a very small quantity of carbon monoxide for one hour at 380–390° F. and 1500 p.s.i.g. The resulting dark red solution had an oxygen content of about 10 wt. percent based on the resin and the infra red spectrum showed an intense hydroxyl group absorption and a relatively small carbonyl group absorption. This hydroxylated resin showed essentially no unsaturation. The resulting solution of hydroxylated resin was treated to remove the cobalt catalyst and the polymer solution was esterified by heating with the stoichiometric quantity of maleic anhydride. After stripping free of solvent the resulting pale yellow resin was found to have an acid number of 150. One hundred and five grams of this acidic resin were placed in a beaker in an ice bath and 142 grams of triethyl amine was added in 10–15 gram increments while manually mixing with a spatula. The resulting viscous liquid resin had a Gardner color of 8 and a viscosity of 450 stokes. It was miscible with water in all proportions giving completely clear and homogeneous solutions which are particularly suitable for coating metallic objects by electrodeposition.

Q panels were coated with a 38.8 wt. percent aqueous solution of the aminated resin and cured by baking according to the following schedule:

TABLE V

| Cure | | Film Th. (mils) | Hardness Pencil | Flex. ⅛ in. Mandrel | Impact | |
|---|---|---|---|---|---|---|
| Time, Min. | Temp., ° F. | | | | Direct, lb. | Reserve, lb. |
| 30 | 275 | 0.6 | HB | Pass | 140 | 160 |
| 30 | 275 | 1.2 | B | Pass | 100 | 100 |
| 30 | 300 | 0.6 | 4H | Pass | 160 | 160 |
| 30 | 300 | 1.2 | H | Pass | 150 | 140 |

The above example shows that the low viscosity resins obtained in accordance with the process of the present invention are particularly suitable as the precursor of water-soluble coatings having outstanding impact resistance.

A polymer prepared according to the general conditions of Run 11, Example 4, when processed in a manner similar to that described above gave an amine salt resin having a viscosity in excess of 3000 stokes and was generally unsuitable for coating use.

Example 6

This example illustrates the practicality of preparing extremely low (oligomeric) molecular weight products by the methods of this invention.

A 2-liter 3 neck flask fitted with a mechanical stirrer, thermometer, gas inlet and exit tubes was charged with 330 grams dry tetrahydrofuran, 37 grams naphthalene and 13 grams of sodium dispersion (50% Na in n-dodecane). The mixture was heated to about 130° F. for about ten minutes giving a dark green solution. Three hundred and thirty grams of toluene were added and butadiene addition to the vapor phase was started. The temperature was maintained at 75–80° F. by a cooling bath. A total of 444 grams of butadiene was added over a period of eighty minutes. During this period a total of 192 grams of toluene was also added in three additions. The product was quenched with concentrated HCl and filtered.

The product (1353 grams) was charged to a 30 plate distillation column. Unreacted toluene and tetrahydrofuran amounting to 531 grams was removed at atmospheric pressure. The distillation was continued at 8 mm. Hg pressure and the following fractions were collected:

| Fraction No. | Boiling Range ° F. at 8 mm. Hg | Wt. Percent of total product |
| --- | --- | --- |
| 1 | 174–178 | 18.6 |
| 2 | 262–268 | 18.1 |
| 3 | 327–349 | 7.8 |
| Heavier Residues | | 13.0 |

Fraction No. 1 was identified principally as 5-phenyl pentene-2 (mostly trans isomer). Fraction No. 2 was principally 9-phenyl nonadiene 1,6 (mostly trans isomer). Fraction No. 3 contained several isomeric phenyl tridecatrienes.

The nature of the present invention having thus been fully set forth and specific examples of the same given, what is claimed as new, useful and unobvious and desired to be secured by Letters Patent is:

We claim:
1. The method for the preparation of low molecular weight polymers which comprises polymerizing a conjugated diolefin of 4 to 6 carbon atoms or copolymerizing said diolefin with a vinyl aromatic hydrocarbon in a reaction medium consisting essentially of 5 to 85 wt. percent of an alkylated aromatic hydrocarbon and 95 to 15 wt. percent of an ether chosen from the group consisting of tetrahydrofuran, tetrahydropyran, dimethyl ether, dimethoxy ethane, dimethoxy methane and methylal in the presence of 0.1 to 5 wt. percent of sodium or potassium aromatic hydrocarbon addition complex catalyst, based on reaction medium, a temperature of 15 to 150° F. with a monomer concentration of 0.1 to 10 wt. percent based on the reaction medium for from 0.2 to 6 hours.
2. The method of claim 1 in which the diolefin is butadiene-1,3.
3. The method of claim 2 in which the alkylated aromatic hydrocarbon is toluene.
4. The method of claim 2 in which the alkylated aromatic hydrocarbon is xylene.
5. The method of claim 2 in which the ether is tetrahydrofuran.
6. The method of claim 5 in which the catalyst is sodium naphthalene.

References Cited
UNITED STATES PATENTS 2,993,050  7/1961  Gleason et al. _____ 260—669
3,324,191  6/1967  Wofford _____ 260—669

PAUL M. COUGHLAN, Jr., *Primary Examiner.*

C. R. DAVIS, *Assistant Examiner.*